United States Patent [19]

Hall

[11] 4,429,091

[45] Jan. 31, 1984

[54] OLIGOMERIC OXOLANYL ALKANES AS MODIFIERS FOR POLYMERIZATION OF DIENES USING LITHIUM-BASED INITIATORS

[75] Inventor: James E. Hall, Akron, Ohio

[73] Assignee: The Firestone Tire & Rubber Company, Akron, Ohio

[21] Appl. No.: 473,473

[22] Filed: Mar. 9, 1983

[51] Int. Cl.³ .............................................. C08F 4/48
[52] U.S. Cl. .................................... 526/181; 502/157
[58] Field of Search ...................... 526/177, 181, 335; 252/431 R

[56] References Cited

U.S. PATENT DOCUMENTS 3,726,832  4/1973  Komatsu ............................ 526/181

Primary Examiner—Paul R. Michl
Attorney, Agent, or Firm—Frank J. Troy, Sr.

[57] ABSTRACT

A process and catalyst system is disclosed herein for the preparation of (co)polymers having a 1,2-microstructure of between 20 and 95 percent. These (co)polymers are prepared in a hydrocarbon or other non-polar solvent from a monomer system which contains at least one 1,3-diene monomer. The catalyst system which is employed in the production of the (co)polymers of the present invention is a combination of (1) an anionic initiator based on lithium, and (2) a modifier compound selected from the group consisting of linear and cyclic oligomeric oxolanyl alkanes.

10 Claims, No Drawings

OLIGOMERIC OXOLANYL ALKANES AS MODIFIERS FOR POLYMERIZATION OF DIENES USING LITHIUM-BASED INITIATORS

BACKGROUND OF THE INVENTION

The polymerization of 1,3-dienes to rubbery polymers, such as polybutadiene, using a butyl lithium catalyst in a hydrocarbon diluent normally yields a polymer containing 90% 1,4-microstructure and 10% 1,2-microstructure. Diene polymers and copolymers having increased 1,2-microstructure content have become of interest for use in applications such as for tire rubbers, molded rubber goods, molding compounds, surface coatings and the like.

It has now been discovered that increased percentages of 1,2-microstructure can be obtained by carrying out the polymerization in the presence of a modifier compound of a linear or cyclic oligomeric oxolanyl alkane.

SUMMARY OF THE INVENTION

A process and catalyst system is disclosed herein for the preparation of (co)polymers containing a 1,2-microstructure of between about twenty (20) and about ninety-five (95) percent. These (co)polymers are prepared in an inert non-polar solvent such as a hydrocarbon solvent from a monomer system which contains at least one 1,3-diene monomer. The catalyst system which is employed in the production of the (co)polymer is an anionic initiator based on lithium and a modifier compound of a linear or cyclic oligomeric oxolanyl alkane.

DETAILED DESCRIPTION OF THE INVENTION

The process of the present invention for the preparation of polybutadiene or other (co)polymers formed from at least one 1,3-diene monomer employs a novel catalyst system which produces a polymer which has a 1,2-microstructure ranging between about twenty (20) and ninety-five (95) percent in the 1,3-diene monomer contributed units.

The polymerization catalyst which is used in the present invention is a combination of (1) an anionic initiator based on lithium, and (2) a modifier compound selected from the group consisting of linear and cyclic oligomeric oxolanyl alkanes.

MONOMER SYSTEM

The catalyst system of the present invention is used in preparing (co)polymers having an increased vinyl content in the 1,3-diene monomers contributed units. Polymerizable 1,3-dienes employed in the production of the polymers of the present invention are 1,3-conjugated dienes containing from four to twelve, inclusive, carbon atoms per molecule. Examples thereof include the following: 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkylbutadienes, it is preferred that the alkyl groups contain from one to three carbon atoms. Numerous others are disclosed, for instance, in U.S. Pat. No. 3,377,404, the disclosure with respect to which is incorporated herein by reference.

The preferred 1,3-diene monomer for use in the present invention is butadiene.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. Comonomers of different 1,3-diene monomers can be combined in any proportion. The term (co)polymer is defined herein as either a homopolymer or a copolymer formed from at least one diene monomer and optionally one or more copolymerizable monomers.

In addition to the above described conjugated dienes, one or more suitable copolymerizable monomers such as vinyl-substituted aromatic monomers can be incorporated into the polymerization mixture. Examples of suitable copolymerizable monomers for use in the preparation of copolymers in the present invention include: styrene; alpha-methylstyrene; 1-vinylnaphthalene; 2-vinylnaphthalene; 1-alpha-methylvinylnaphthalene; 2-alpha-methylvinylnaphthalene; 1,2-diphenyl-4-methylhexene-1; 1,6-diphenyl-hexadiene-1,5; 1,3-divinylbenzene; 1,3,5-trivinylbenzene; 1,3,5-triisopropenylbenzene; 1,4-divinylbenzene; 1,3-distyrylbenzene; 1,4-distyrylbenzene; 1,2-distyrylbenzene; and mixtures of these, as well as alkyl, cycloalkyl, aryl alkaryl and aralkyl derivatives thereof in which the total number of carbon atoms in the combined hydrocarbon constitutes generally not greater than 12. Examples of these latter compounds include: 4-methylstyrene; vinyl toluene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyl-toluene. Again reference is made to U.S. Pat. No. 3,377,404 for disclosures of additional vinyl-substituted aromatic compounds which are incorporated herein by reference.

When a comonomer system employs one or more copolymerizable monomers other than a 1,3-diene monomer, generally at least one percent preferably at least five percent by weight of the copolymerizable monomers should be used and as much as eighty-five percent, preferably no more than forty percent may be used.

The solution polymerization takes place in inert organic diluents, in which the monomer, anionic initiator and the modifier compound are soluble. The anionic initiator may not be soluble in these solvents in some instances. Many suitable inert diluents are known in the art and those diluents generally preferred are alkanes, or other non-polar solvents. Suitable diluents include but are not limited to ethane, propane, iso- and n-butane, iso- and n-pentane, iso- and n-hexane, iso- and n-heptane, iso- and n-octane, cyclobutane, cyclopentane, cyclohexane, cycloheptane, cyclooctane; benzene and toluene. Preferred diluents are iso- and n-butane, iso- and n-pentane, iso- and n-hexane, iso- and n-heptane. The diluents can be employed either alone or in admixture, e.g., as a hydrocarbon distillate fraction.

The concentration of monomer in solvent ranges from 2 to 50 wt. percent or more and is generally dependent upon economics and the ability to control reaction conditions and to handle the polymer solution. The use of monomer concentrations ranging from between 15 to 25 wt. percent is generally practical.

Catalyst System

The catalyst system employed in the present invention is a combination of (1) an anionic initiator based on lithium, and (2) a modifier compound selected from the group consisting of linear and cyclic oligomeric oxolanyl alkanes.

The anionic initiators based on lithium can be selected from any known organolithium compounds which are known in the art as being useful in the polymerization of 1,3-diene monomers. Suitable catalysts which initiate polymerization of the monomer system include organolithium catalysts which have the formula $R(Li)_{x''}$ wherein R represents a hydrocarbyl radical of 1 to 20, preferably 2–8, carbon atoms per R group, and $x''$ is an integer of 1–4. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include:

phenyllithium, naphthyllithium, 4-butylphenyllithium, p-tolyllithium, 4-phenylbutyllithium; 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as $R(Li)_{x''}$. The preferred lithium catalyst for use in the present invention is n-butyllithium.

Other lithium catalysts which can be employed are lithium dialkyl amines, lithium dialkyl phosphines, lithium alkyl aryl phosphines and lithium diaryl phosphines.

The modifier compounds which are used in the present invention in combination with the anionic initiators are represented by the structural formulas I and II:

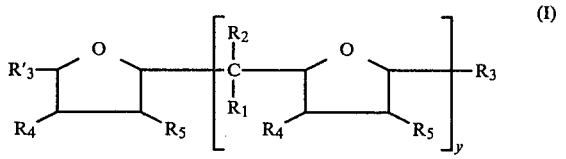

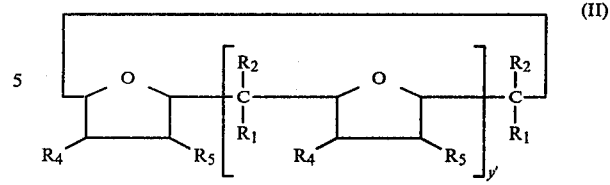

wherein $R_1$ and $R_2$ independently are hydrogen or an alkyl group and the total number of carbon atoms in $—CR_1R_2—$ is between one and nine inclusive; y is an integer of 1 to 5 inclusive, y' is an integer of 3 to 5 inclusive, $R_3'$, $R_3$, $R_4$ and $R_5$ independently are $—H$ or $—C_nH_{2n+1}$ wherein $n=1$ to 6.

While the modifiers of structural formula I are linear oligomers and the modifiers represented by structural formula II are cyclic oligomers, hereinafter the term oxolanyl modifiers is contemplated to encompass the modifiers of both structural formulas.

The oxolanyl modifiers are prepared by methods known to those skilled in the art. Typically the modifiers are prepared by reacting furan, which is unsubstituted in either or both of the 2- or 5-positions, with either an aldehyde or a ketone, such as acetone, in the presence of an acid such as hydrochloric acid. Careful control of the reaction parameters allows for the production of a product containing up to 95 percent of dimers, trimers, and tetramers. Once the linear oligomers or cyclic structures are formed these reaction products are hydrogenated in the presence of suitable hydrogenation catalysts such as nickel based catalysts. Any suitable hydrogenation process known in the art may be employed to produce the modifier compounds of structural formulas I or II.

While unsubstituted furans are the preferred reactant, 2-alkyl-furans containing up to six carbon atoms in the alkyl group can be employed in the production of the oxolanyl oligomers of structural formula I. When 2-alkyl-furans are employed in the production of modifiers furfuryl dimers are the main reaction product. The 2-alkyl-furan also may end cap any oligomers formed if furan is used as a coreactant.

The cyclic oxolanyl oligomer modifier precursors are formed only by the reaction of a furan compound which is unsubstituted in the 2,5-position with either one or more aldehydes or one or more ketones or a mixture thereof.

Suitable oligomeric modifiers for use in the catalyst system include but are not limited to: bis(2-oxolanyl) methane; 2,2-bis(2-oxolanyl) propane; 1,1-bis(2-oxolanyl) ethane; 2,2-bis(2-oxolanyl) butane; 2,2-bis(5-methyl-2-oxolanyl) propane; 2,2-bis-(3,4,5-trimethyl-2-oxolanyl) propane. These modifier compounds represent a few of the dimer compounds represented by structural formula I and other linear and cyclic oligomer modifiers are apparent from their structural formulas.

The preferred oxolanyl modifiers for use in the present invention are the dimeric 2,2-bis(2-oxolanyl) propane and the trimeric 2,5-bis(2-oxolanyl-2-propyl) oxolane.

The molar ratio of the oxolanyl modifiers to the anionic initiator can vary from 1.0/20.0 to 20.0/1.0, preferably from 1.0/1.0 to 10.0/1.0.

The catalyst mixture of the oxolanyl modifier and anionic initiator can be mixed in-situ with the monomer charge or can be premixed and added to the monomer system.

The catalyst mixture of the present invention is employed in amounts designed to result in the desired molecular weight. For example, a polybutadiene of 100,000 $\overline{M}_n$ would be prepared by charging enough active anionic initiator based on lithium to react with impurities plus 1.0 mmole of lithium per one-hundred grams of 1,3-butadiene. Polymers of from 1,000 $\overline{M}_n$ to 500,000 $\overline{M}_n$ can be readily made by one skilled in this technology.

The millimole ratio of the catalyst mixture to the weight of the monomers which is employed in the preparation of the co(polymers) of the present invention is based upon the number of millimoles of the anionic initiator based on lithium per hundred grams of monomer. The ratio of millimoles of anionic initiator per hundred grams of monomer for use in the present invention ranges between 0.2 millimoles to 100 millimoles, preferably 0.3 millimoles to 3.0 millimoles of anionic initiator based on lithium per hundred grams of monomer.

The amount of catalyst mixture, as well as the ratio of the oxolanyl modifier to the anionic initiator, employed in producing the (co)polymers of the present invention determine the content of 1,2-microstructure in the 1,3-diene (co)polymer finally produced. It has been determined that the 1,3-diene (co)polymers produced according to the process of this invention should have a vinyl content ranging between about twenty (20) to ninety-five (95) percent 1,2-microstructure.

All amounts of anionic initiators and oxolanyl modifiers as indicated by moles per grams of monomer or by ratio of components in the instant invention are considered to be catalytically effective amounts, that is, effective amounts for initiating and conducting polymerization of the disclosed monomer systems to produce a (co)polymer containing a 1,2-microstructure ranging between about 20 to 95 percent in the 1,3-diene monomer contributed units.

Process conditions such as the initial and maximum temperature of the polymerization reaction and the absolute concentration of modifier can independently affect the final 1,2-microstructure content of the 1,3-diene (co)polymers. These conditions can be controlled for each monomer reaction system to produce the final desired 1,2-microstructure content of from about twenty (20) to about ninety-five (95) percent. It is desirable to produce polymers and copolymers having a 1,2-microstructure between 35 and 60 percent in the 1,3-diene monomer contributed units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

The polymerization of 1,3-diene monomer in the aforementioned system is preferably effected adiabatically with an increase in temperature occurring during the course of the reaction. As used in this connection the term adiabatic polymerization means that heat is neither supplied or removed during the course of polymerization.

The present polymerization system is applicable to solution polymerization techniques which are conducted at temperatures of 0° C. to 160° C., preferably 90° to 160° C. Reaction temperature below 90° C. temperature range normally produce (co)polymers containing a very high 1,2-microstructure, for example, between 60 and 95 percent of a 1,2-microstructure. Reaction temperatures between 90° C. and 160° C. generally produce (co)polymers containing between 20 and 60 percent of a 1,2-microstructure. Any temperature in this range of 0° C. to 160° C. which gives a convenient polymerization rate while producing a (co)polymer having a 1,2-microstructure ranging between 20 and 95 percent is acceptable. If the operation is to be conducted as a batch operation, initiation temperatures of less than 90° C. are preferred. If the operation is to be a continuous operation higher initiation temperatures can be employed, such as 100° C. to 120° C., and it is preferred that the polymerization process be maintained in a range of from 90° C. to 160° C., most preferably 115° C. to 140° C.

The polymerization reaction can be performed at pressures between 0.5 to 100 atmospheres. When the desired degree of polymerization has been reached, the (co)polymer can be isolated by precipitation with a non-solvent such as methanol, isopropanol or water and an appropriate antioxidant can be added at this stage of polymerization. Alternatively, the solution can be injected into the slurry tank containing a hot non-solvent whereupon the solvent is flashed off and the (co)polymer remains as a slurry with the non-solvent. Alternatively, the solvent can be removed directly by the application of heat and/or flashing to a lower pressure.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. The number average molecular weight of the final (co)polymer produced can range from 1,000 to 500,000. These (co)polymers depending on their molecular weight and composition can be used for a variety of applications ranging from molding materials, rubber goods such as tires, and various adhesive applications.

It is believed that one skilled in the art can, using the preceding description, utilize the present invention to its fullest extent. The following preferred specific embodiments are, therefore, to be construed as merely illustrative of the catalyst system and the polymerization process of the present invention.

In the following examples, the preparation of the oligomeric oxolanyl propanes was as follows: 1.5 moles of furan and 1.0 mole of acetone was reacted in the presence of 0.15 moles HCl (37% aqueous solution) at 20°–50° C. for 24 hours. The product, polydimethylfurfuryl oligomers containing 2–6 furyl units, is separated from an aqueous layer, neutralized with a base and purified by vacuum distillation. The oligomers are hydrogenated in the presence of a nickel catalyst system to oxolanyl alkane oligomers which are purified, dried and ready for use as oxolanyl modifiers. In the examples, the quantity of oxolanyl modifier added is presented as milliequivalents of tetrahydrofuran (THF) functional groups in the oxolanyl modifier. This has been done because for many of the experiments, the modifier used contains a mixture of oxolanyl oligomers.

EXAMPLE 1

A one gallon stainless steel reactor equipped with a stirrer blade is charged with 216 grams of 1,3-butadiene monomer in 2050 grams of n-hexane and four milliequivalents THF oxolanyl modifier and the temperature is adjusted to 98° C. Two millimoles of n-butyllithium is added to the mixture in the reaction vessel. The reaction temperature increases and is maintained at 125° C. and polymerization is completed within 30 minutes. After termination of the reaction, 0.5 percent by weight of an antioxidant, di-tert-butyl-p-cresol ("IONOL"), based on the butadiene mixture is added to the mixture which is coagulated in isopropanol and drum dried to isolate the solids. The product polybutadiene contains 34.0 percent of 1,2-microstructure as determined by IR spectroscopy. The recovered polymerization product represents a 98 percent conversion of the monomer to polymer.

EXAMPLE 2

In accordance with the procedures of Example 1, a charge of 216 grams of 1,3-butadiene monomer in 2050 grams of n-hexane, two millimoles of n-butyllithium and 8.0 milliequivalents of THF oxolanyl modifier are reacted at an initial temperature of 108° C. The temperature increases and is maintained at 115° C. for a period of 30 minutes. The product polybutadiene contains 49.0 percent of 1,2-microstructure. The recovered polymer product represents a 92 percent conversion of monomer to polymer.

EXAMPLE 3

In accordance with the procedure of Example 1, a charge of 216 grams of 1,3-butadiene in 2050 grams of n-hexane, 2.0 millimole of n-butyllithium and 4.0 milliequivalents of THF 2,2-bis(2-oxolanyl) propane are reacted at an initial temperature of 97° C. The maximum reaction temperature reaches 121° C. after a period of ½ hour. The reaction product displays a 94 percent conversion of monomer to polymer. The product polybutadiene contains 40.0 percent of a 1,2-microstructure.

EXAMPLES 4 THROUGH 17

The reaction conditions of Examples 4 through 17 which were prepared in accordance with the procedures of Example 1, and the properties of the polymers thus obtained are set forth in Table 1.

EXAMPLES 18 THROUGH 22

The butadiene polymer and styrene-butadiene copolymers produced in Examples 18 through 22 were prepared in accordance with the procedures of Example 1. The reaction conditions and the properties of the (co)polymers thus obtained are set forth in Table 2.

From the foregoing description, one skilled in the art can easily ascertain the essential characteristics of this invention, and without departing from the spirit and scope thereof, can make various changes and modifications of the invention to adapt it to various usages and conditions.

TABLE 1

| | Reaction Condition | | | | | Polymer Properties | |
|---|---|---|---|---|---|---|---|
| Example No. | 1,3-Buta-[1] diene by Weight | n-Butyllithium Millimoles PHG Monomer | Oxolanyl Modifier Milliequivalent Per Millimole of n-Butyllithium | Poly.[6] Temp. (°C.) | Poly.[7] React. Tm. (Hrs) | 1,2-Microstructure (Percent) | Conversion Monomer to Polymer (Percent) |
| 4 | 9.2 | 0.7 | 10.0[2] | 101–118 | 0.5 | 52 | 96 |
| 5 | 18.6 | 1.0 | 1.0[3] | 50 | 18 | 46 | 96 |
| 6 | 16.9 | 1.0 | 6.0[3] | 50 | 18 | 76 | 96 |
| 7 | 13.7 | 1.0 | 4.0[4] | 70 | 24 | 60 | 100 |
| 8 | 9.6 | 0.5 | 2.4[4] | 110–129 | 1 | 42 | 94 |
| 9 | 9.6 | 0.5 | 2[4] | 110–129 | 1 | 39 | 92 |
| 10 | 15.0 | 1.0 | 8.0[5] | 5 | 18 | 95 | 96 |
| 11 | 15.0 | 1.0 | 8.0[5] | 30 | 18 | 89 | 95 |
| 12 | 15.0 | 1.0 | 8.0[5] | 50 | 18 | 81 | 95 |
| 13 | 15.0 | 1.0 | 8.0[5] | 80 | 18 | 67 | 92 |
| 14 | 9.9 | 1.5 | 4.0[5] | 98–125 | 0.5 | 24.6 | 100 |
| 15 | 9.9 | 1.5 | 8.0[5] | 98–117 | 0.5 | 34.6 | 98 |
| 16 | 9.9 | 1.5 | 16.0[5] | 98–104 | 0.5 | 47.5 | 98 |
| 17 | 14.8 | 2.3 | 18.0[5] | 98–124 | 0.5 | 48.7 | 92 |

[1]In hexane
[2]2,2-bis(oxolanyl) propane
[3]Oligomeric oxolanyl propane (dimer thru hexamer)
[4]Octamethylperhydrocyclotetrafurfurylene (cyclic tetramer)
[5]2,2-bis(5-methyl-2-oxolanyl) propane
[6]Initial to maximum polymerization temperature (°C.)
[7]Polymerization Reaction time (hours)

TABLE 2

| | Reaction Conditions | | | | | | Polymer Properties | | | | |
|---|---|---|---|---|---|---|---|---|---|---|---|
| Example No. | 1,3-Butadiene % by Weight (1) (grams) | Styrene % Total Monomer | N—Butyllithium Millimoles PHG Monomer | Oxolanyl Modifier (2) Milliequivalents Per Millimole n-Butyllithium | Polym. (3) Temp. (°C.) | Poly. Reaction Time (Hours) | 1,2-Microstructure (Percent) | Conversion (4) Percent | $\overline{M}_n$ | $\overline{M}_w/\overline{M}_n$ | $T_g$(°C.) |
| 18 | 9.7 (226) | 0 | 1.4 | 4.0 | 98–109 | 1.0 | 50.6 | 90 | 147,800 | 1.34 | −68 |
| 19 | 10.6 (226) | 9.1 | 1.3 | 4.0 | 99–104 | 1.0 | 51.4 | 95 | 224,600 | 1.35 | −56 |
| 20 | 17.9 (339) | 21.1 | 1.3 | 4.0 | 101–143 | 0.5 | 42.3 | 92 | 172,300 | 1.55 | −50.5 |
| 21 | 15.7 (283) | 25.2 | 1.1 | 4.0 | 99–137 | 0.5 | 40.0 | 100 | 197,100 | 1.44 | −46.5 |

TABLE 2-continued

| Example No. | 1,3-Butadiene % by Weight (1) (grams) | Styrene % Total Monomer | Reaction Conditions | | Polym. (3) Temp. (°C.) | Poly. Reaction Time (Hours) | Polymer Properties | | | | |
|---|---|---|---|---|---|---|---|---|---|---|---|
| | | | N—Butyllithium Millimoles PHG Monomer | Oxolanyl Modifier (2) Milliequivalents Per Millimole n-Butyllithium | | | 1,2-Microstructure (Percent) | Conversion (4) Percent | $\overline{M}_n$ | $\overline{M}_w/\overline{M}_n$ | $T_g$(°C.) |
| 22 | 15.7 (283) | 25.2 | 0.9 | 4.0 | 97–132 | 1.0 | 40.0 | 98 | 286,000 | 1.75 | −47 |

(1) In Hexane
(2) Oligomeric oxolanyl propane (dimer through hexamer)
(3) Initial to maximum polymerization temperature
(4) Conversion of monomer to polymer

I claim:
1. A catalyst system comprising:
(a) at least one anionic initiator based on lithium, and
(b) at least one oxolanyl compound selected from the group consisting of:

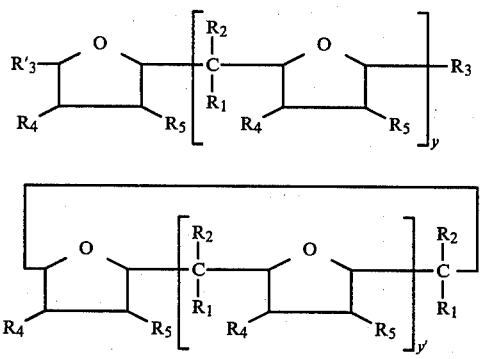

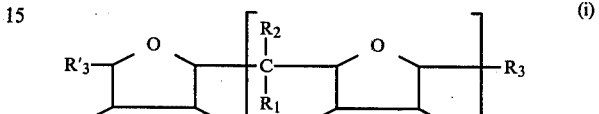

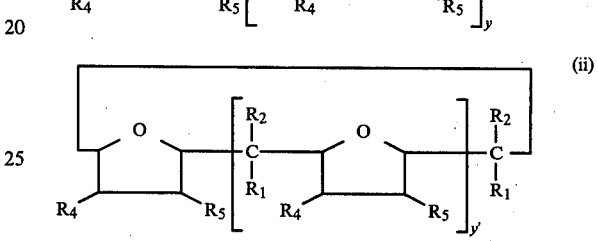

wherein $R_1$ and $R_2$ independently are hydrogen or an alkyl group and the total number of carbon atoms in —$CR_1R_2$— ranges between one and nine inclusive; y is an integer of 1 to 5 inclusive, y' is an integer of 3 to 5 inclusive, $R_3'$, $R_3$, $R_4$ and $R_5$ independently are —H or —$C_nH_{2n+1}$ wherein n=1 to 6.

2. The catalyst system of claim 1 wherein the anionic initiator is n-butyllithium.
3. The catalyst system of claim 1 wherein the oxolanyl compound (b) is 2,2-bis(2-oxolanyl) propane.
4. A process for the preparation of a polymer by polymerizing:
(A) 15 to 100 percent of at least one 1,3-diene monomer, and
(B) 0 to 85 percent of one or more reactive monomers which are copolymerizable with said 1,3-diene monomers,
in an inert non-polar solvent in the presence of a catalytically effective amount of a catalyst system comprising:
(a) at least one anionic initiator based on lithium, and
(b) at least one oxolanyl modifier compound selected from the group consisting of:

wherein $R_1$ and $R_2$ independently are hydrogen or an alkyl group and the total number of carbon atoms in —$CR_1R_2$— ranges between one and nine inclusive; y is an integer of 1 to 5 inclusive, y' is an integer of 3 to 5 inclusive, $R_3'$, $R_3$, $R_4$ and $R_5$ independently are —H or —$C_nH_{2n+1}$ wherein n=1 to 6;
in which the molar ratio of the anionic initiator (a) to the oxolanyl modifier (b) ranges between about 20.0/1.0 to about 1.0/20.0, the millimoles of the anionic initiator per 100 grams of the (A+B) monomers ranges between about 0.2 and about 100, the polymerization temperature is maintained between about 0° C. and 160° C., wherein said polymer contains a 1,2-microstructure in the 1,3-diene monomer contributed units ranging between 20 and 95 percent.
5. The process as in claim 4 wherein the 1,3-diene is a butadiene.
6. The process as in claim 4 wherein the 1,3-diene is butadiene and the reactive monomer is styrene.
7. The process as in claim 4 wherein the anionic initiator (a) is n-butyllithium.
8. The process as in claim 4 wherein the oxolanyl modifier is 2,2-bis(2-oxolanyl) propane.
9. The process as in claim 4 wherein the polymer has a 1,2-microstructure ranging between 30 and 60 percent.
10. The process as in claim 4 wherein the polymerization temperature is maintained between 115° C. and 140° C.

* * * * *